(12) United States Patent
Demissy

(10) Patent No.: US 9,890,897 B2
(45) Date of Patent: Feb. 13, 2018

(54) SUPPORT STRUCTURE COMPRISING A SHOCK ABSORBING PILLAR

(71) Applicant: Alstom Technology Ltd., Baden (CH)

(72) Inventor: Daniel Demissy, Quebec (CA)

(73) Assignee: ALSTOM TECHNOLOGY LTD, Baden (CH)

( * ) Notice: Subject to any disclaimer, the term of this patent is extended or adjusted under 35 U.S.C. 154(b) by 0 days.

(21) Appl. No.: 15/031,423

(22) PCT Filed: Oct. 28, 2014

(86) PCT No.: PCT/EP2014/073081
§ 371 (c)(1),
(2) Date: Apr. 22, 2016

(87) PCT Pub. No.: WO2015/063065
PCT Pub. Date: May 7, 2015

(65) Prior Publication Data
US 2016/0258570 A1    Sep. 8, 2016

(30) Foreign Application Priority Data
Oct. 29, 2013    (FR) .................................... 13 60517

(51) Int. Cl.
A47G 29/00    (2006.01)
F16M 11/22    (2006.01)
E04B 1/98    (2006.01)
E04C 3/30    (2006.01)

(52) U.S. Cl.
CPC .............. F16M 11/22 (2013.01); E04B 1/98 (2013.01); E04B 1/985 (2013.01); E04C 3/30 (2013.01)

(58) Field of Classification Search
CPC ............................ F16M 11/046; F16M 11/08
See application file for complete search history.

(56) References Cited

U.S. PATENT DOCUMENTS 1,977,175 A * 10/1934 Davis ...................... F16L 15/08
138/109
3,781,639 A * 12/1973 Peschel ................... H01F 27/40
307/150
4,634,434 A * 1/1987 Marino, Jr. ........ A61M 5/16881
138/46

(Continued)

FOREIGN PATENT DOCUMENTS

| AT | 506 245 A1 | 7/2009 |
| JP | 2002-138597 A | 5/2002 |
| JP | 2002-227898 A | 8/2002 |

OTHER PUBLICATIONS

Search Report issued in French Patent Application No. FR 13 60517 dated Jul. 3, 2014.

(Continued)

Primary Examiner — Amy Sterling
(74) Attorney, Agent, or Firm — Pearne & Gordon LLP

(57) ABSTRACT

The invention provides a support structure (10) comprising at least one cylindrical pillar (16) of vertical main axis, having a bottom end (16i) that is connected to the ground (14) and a top end (16s) connected to a component to be supported; the support structure being characterized in that the pillar (16) includes at least one helical slot (20) coaxial about the main axis of the pillar (16).

7 Claims, 2 Drawing Sheets

(56) References Cited

U.S. PATENT DOCUMENTS

| | | | | |
|---|---|---|---|---|
| 4,835,924 A * | 6/1989 | Blacklin | ............... | E04D 11/005 |
| | | | | 52/263 |
| 6,332,292 B1 * | 12/2001 | Buzon | ................... | E04D 11/007 |
| | | | | 248/351 |
| 6,637,161 B1 * | 10/2003 | Buchalter | ......... | E04F 15/02447 |
| | | | | 52/126.6 |
| 7,921,612 B2 * | 4/2011 | Knight, III | ........... | B23Q 1/0054 |
| | | | | 248/188.4 |
| 8,892,998 B2 * | 11/2014 | Yamada | ............. | H04N 1/00209 |
| | | | | 709/206 |
| 9,556,621 B2 * | 1/2017 | Pelc | ................... | E04F 15/02452 |
| 2009/0206231 A1 * | 8/2009 | Firman | ................ | A47B 91/024 |
| | | | | 248/677 |
| 2013/0092517 A1 | 4/2013 | Demissy | | |

OTHER PUBLICATIONS

International Preliminary Report on Patentability issued in Application No. PCT/EP2014/073081 dated Sep. 25, 2015.
International Search Report issued in Application No. PCT/EP2014/073081 dated Apr. 9, 2015.
Written Opinion issued in Application No. PCT/EP2014/073081 dated Apr. 9, 2015.

* cited by examiner

SUPPORT STRUCTURE COMPRISING A SHOCK ABSORBING PILLAR

TECHNICAL FIELD

The invention provides a support structure, in particular for medium-, high-, or very high-voltage switchgear.

More particularly, the invention provides a support structure that is of relatively simple design and that is designed to absorb vibrations generated during a seismic shock, for example.

STATE OF THE PRIOR ART

A seismic shock may be characterized by a plurality of excitation frequencies that are transmitted to elements that are in contact with the ground. Some of those frequencies are high, medium, or low.

Each element in contact with the ground has at least one resonant frequency that is a frequency at which the amplitude of the vibrations of the element increases progressively when the element is excited at said resonant frequency.

It is known to connect elements to the ground by means of a support structure that has vibration-absorbing properties, in particular for absorbing seismic vibrations, in order to limit the vibrations that are transmitted to the element.

In general manner, a switchgear support structure consists in a structure of the all-welded type that comprises shock-absorbing elements such as elastically deformable blocks or resilient springs.

The design of the support structure and the choice of shock absorbing elements are defined as a function of the dimensions and of the weight of the support structure and of the supported element, in order to absorb vibratory excitations of frequency corresponding to each of the resonant frequencies of the unit formed by the support structure and the supported element.

That generally leads to making a support structure that is particularly complex and therefore costly.

The invention aims to provide a support structure that is of relatively simple design, comprising a limited number of components, and that is capable of absorbing vibrations coming from a seismic shock, for example.

SUMMARY OF THE INVENTION

A support structure comprising at least one cylindrical pillar of vertical main axis, having a bottom end that is connected to the ground and a top end connected to a component to be supported;

the support structure being characterized in that the pillar includes at least one helical slot coaxial about the main axis of the pillar.

The helical groove makes it possible to impart both vertical and horizontal resilience to the pillar, which resilience may be adjusted and matched to the various resonant frequencies that the unit formed by the support structure and the supported element may possess.

Preferably, the pitch of said at least one helical slot is constant over the entire axial length of the slot.

Preferably, the pitch of said at least one helical slot varies over the entire axial length of the slot.

Preferably, the width of said at least one helical slot is constant over the entire axial length of the slot.

Preferably, the width of said at least one helical slot varies over the entire axial length of the slot.

Preferably, the pillar includes a plurality of helical slots that are axially offset.

Preferably, at least one end of said at least one helical slot opens out into a rounded hole.

Preferably, at least one end of said at least one helical slot opens out at a top or bottom end of the pillar.

Preferably, the support structure comprises a plurality of parallel pillars.

DETAILED DESCRIPTION OF PARTICULAR EMBODIMENTS

Figure 1:
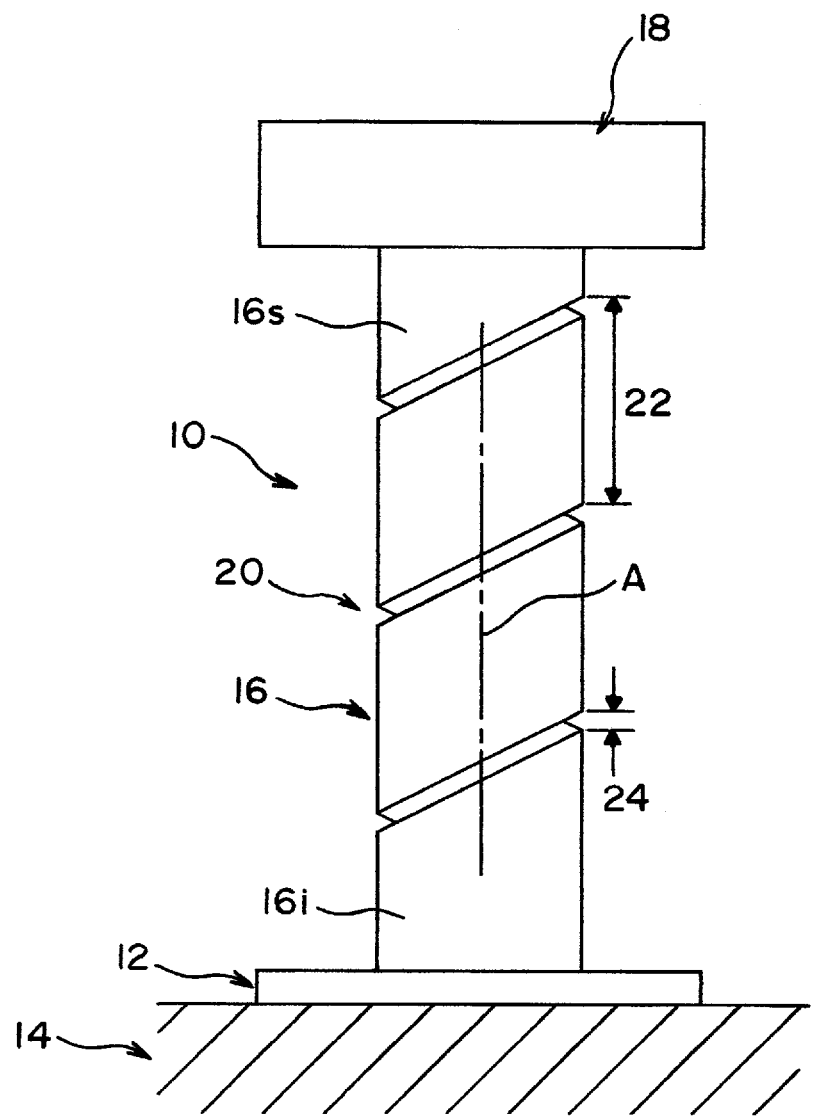
FIG. 1 is a diagram showing a support structure of the invention comprising a single vertical pillar and including one helical groove.

FIG. 1 shows a support structure 10 for a component such as for example a support structure for medium-, high-, or very high-voltage switchgear.

The structure 10 mainly comprises a support base 12 that is fastened to the ground 14, at least one pillar 16 of vertical main orientation, having its bottom end 16i fastened to the base 12 and a support plate 18 fastened to the top end 16s of the pillar 16, on which the component to be supported is fastened.

The pillar 16 consists in a cylindrical tubular element, e.g. of circular section.

In a variant embodiment, the structure 10 comprises a plurality of parallel pillars 16 distributed horizontally between the base 12 and the support plate 18, which pillars are distributed at the vertices of a polygon such as a triangle of a square, for example.

The pillar 16 includes a helical slot 20 that extends coaxially about the main axis A of the pillar 16. This helical slot 20 provides the pillar 16 with the capacity to deform elastically at least in the axial direction. Preferably, the helical slot imparts both vertical and horizontal resilience to the pillar 16, making it possible for the pillar to deform in all directions.

By deforming elastically, the pillar 16 is thus capable of attenuating certain vibrations produced during a seismic shock.

The helical slot 20 is defined by a pitch 22 and a width 24 of the helical slot 20, measured axially. The pitch 22 and the width 24 of the helical slot 20 are defined as a function of each of the resonant frequencies defined by the unit constituted by the structure 10 and the element supported by the structure 10.

In the embodiment shown, the pillar 16 includes a single helical slot 20 of pitch 22 and width 24 that are constant.

In a variant embodiment (FIG. 2), the pillar includes a plurality of slots 20a, 20b that are axially offset relative to one another.

In another variant embodiment (FIG. 2), the pitch 22a of the helical slot 20 varies along the main axis A of the pillar 16.

Also, in another variant embodiment (FIG. 2), the width 24a of the helical slot 20 varies along the main axis A of the pillar 16.

Figure 2:
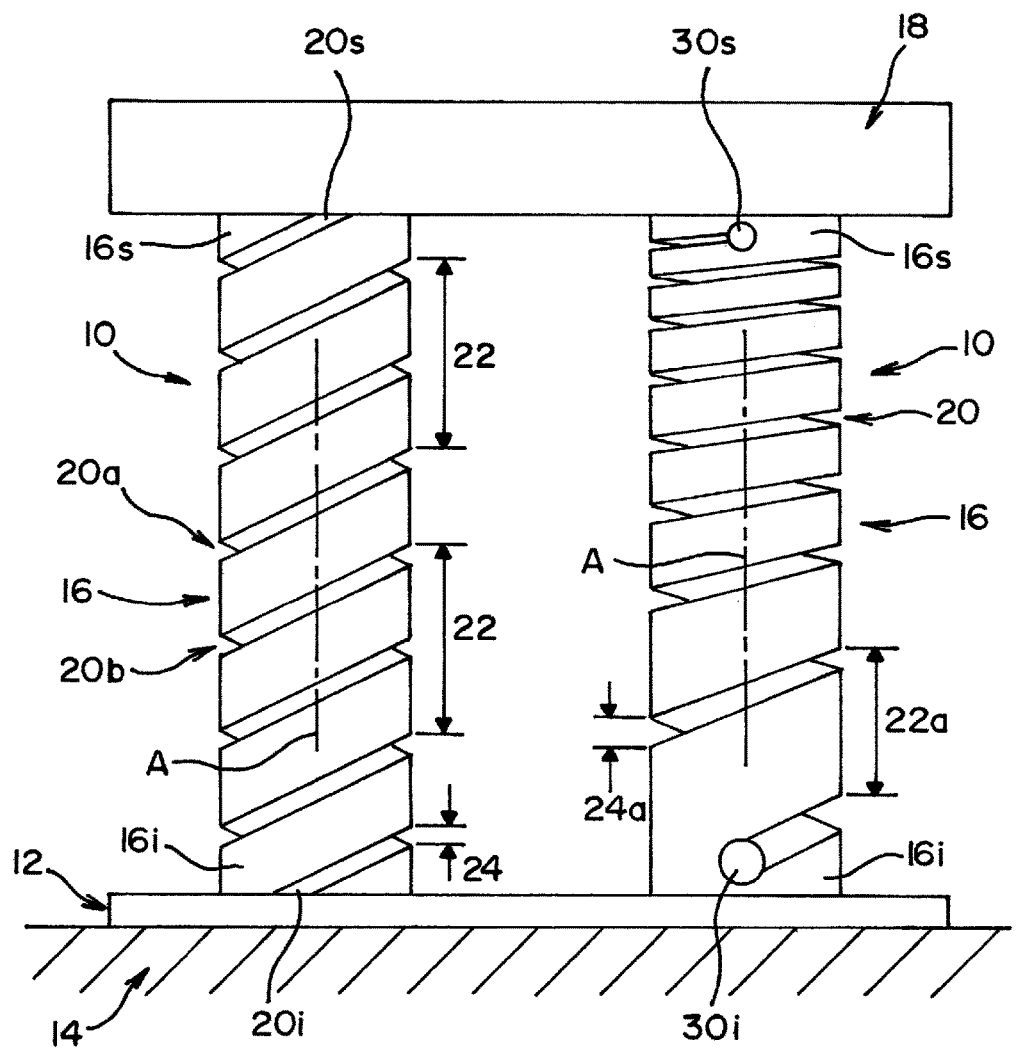
FIG. 2 is a diagram showing a plurality of parallel pillars including a pillar with two helical grooves and a pillar with a helical groove of varying pitch and width.

In another aspect of the helical slot 20, at least one of its ends 20i, 20s opens out at an associated end 16i, 16s of the pillar 16 (FIG. 2).

In a variant, at least one end of the helical slot 20 is situated axially at a distance from the associated end 16i, 16s of the pillar 16 and it opens out into an orifice 30i, 30s of rounded shape that is formed in the pillar 16 (FIG. 2). The purpose of the orifice 30i, 30s is to limit stress concentration at said end of the helical slot 20.

It should be understood that each variant embodiment of the pillar 16 may be implemented alone or in combination.

Thus, each slot 20 may have at least one portion having pitch 22 and/or width 24 that are variable and at least one other portion having pitch 22 and/or width 24 that are constant.

The same applies when the pillar 16 includes a plurality of slots 20, the slots 20 being suitable for being made in different ways, so as to impart the desired vibration-absorbing properties to the structure 10.

What is claimed is:

1. A support structure for absorbing vibrations generated during a seismic shock, the support structure comprising at least one cylindrical pillar of vertical main axis, having a bottom end that is connected to the ground and a top end connected to a component to be supported,
    wherein the pillar includes at least one helical slot coaxial about the main axis of the pillar,
    wherein the pitch of said at least one helical slot varies over the entire axial length of the slot, and
    wherein the at least one helical slot is configured to allow the at least one cylindrical pillar to deform elastically for attenuating vibrations produced during the seismic shock.

2. A support structure according to claim 1, wherein the width of said at least one helical slot is constant over the entire axial length of the slot.

3. A support structure according to claim 1, wherein the width of said at least one helical slot varies over the entire axial length of the slot.

4. A support structure according to claim 1, wherein the pillar includes a plurality of helical slots that are axially offset.

5. A support structure according to claim 1, wherein at least one end of said at least one helical slot opens out into a rounded hole.

6. A support structure according to claim 1, wherein at least one end of said at least one helical slot opens out at a top or bottom end of the pillar.

7. A support structure according to claim 1, wherein it comprises a plurality of pillars that are parallel.

* * * * *